Patented Jan. 16, 1951

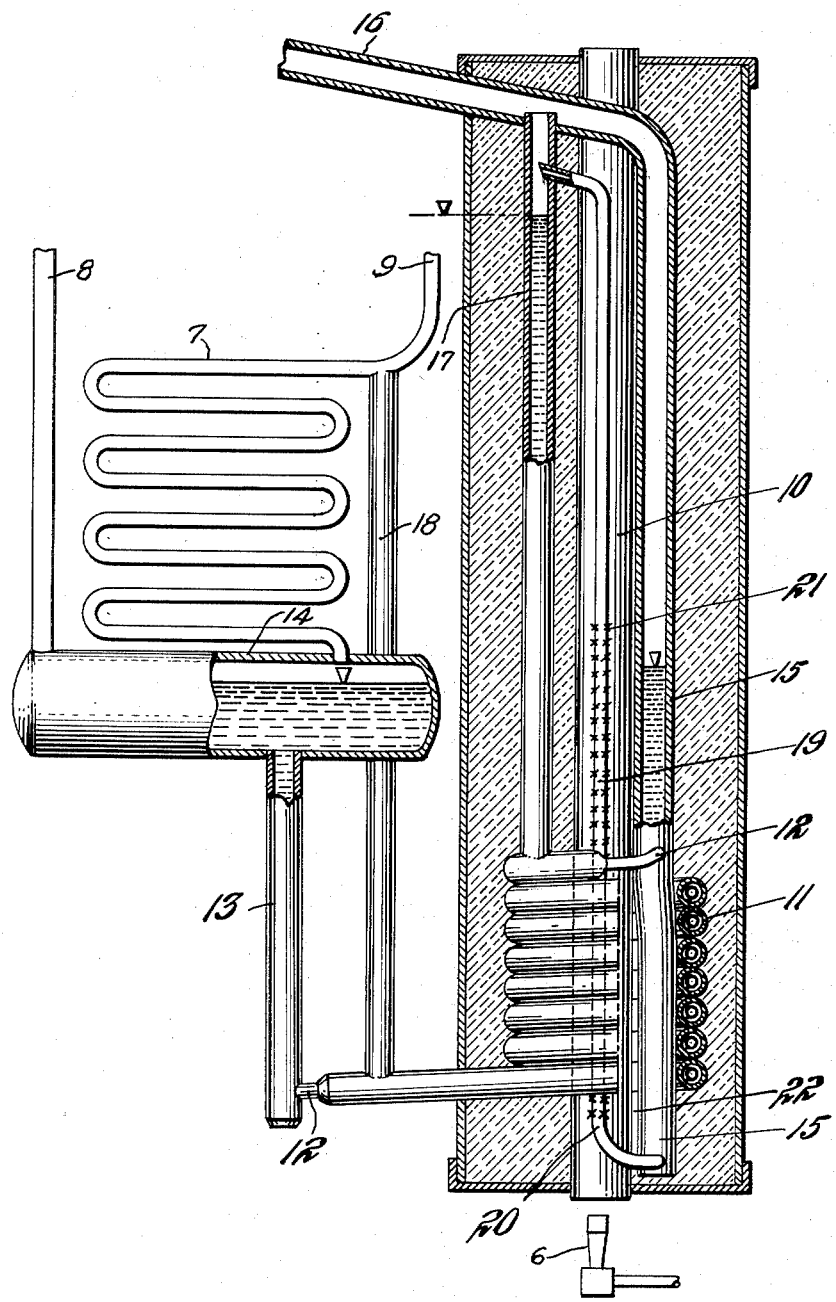

2,538,012

UNITED STATES PATENT OFFICE 2,538,012

ABSORPTION REFRIGERATION

Wilhelm Georg Kögel, Stockholm, Sweden, assignor to Aktiebolaget Elektrolux, Stockholm, Sweden, a corporation of Sweden Application November 23, 1945, Serial No. 630,209
In Sweden December 13, 1944

6 Claims. (Cl. 62—119.5)

This invention relates to absorption refrigerating apparatus of the inert gas type wherein the boiler and the liquid circulating pump are formed of pipes arranged along the outer side of an essentially vertically extending flue tube adapted to be heated by a heat source, such pipes being partly in heat-conductive relation with the flue tube, and wherein the liquid circulating pump is supplied with absorption solution having a refrigerant concentration lower than that of the solution leaving the absorber of the apparatus. The main object of this invention is to provide an improvement for effectively pumping absorption liquid in such apparatus.

It has previously been proposed to form the boiler and the pump in absorption refrigerating apparatus of the inert gas type as pipes arranged in heat-conductive relation with the outside of the flue tube, such pipes being welded to the flue tube along common generatrices, and, through the wall of the flue tube, absorbing heat from a heat source, for example, a gas flame, kerosene flame or an electric heater, disposed in the lower end of the flue tube. In the earlier proposed embodiments of such boilers the liquid circulating pump is adapted to operate with solution rich in refrigerant, due to a direct communication to the absorber vessel through the liquid heat exchanger. In such apparatus the distribution of heat between pump and boiler is of comparatively slight significance, and no difficulties appear in effecting sufficient vapour expulsion in the thermosiphon pump.

In such apparatus, wherein the liquid circulating pump operates with absorption solution relatively poor in refrigerant, such solution before entering the pump already having had some refrigerant expelled therefrom, difficulties have appeared in spite of a very good heat-conductive connection between the lower part of the vapour lift conduit and the flue tube. While these difficulties in pumping apparently are partly due to the ability to provide reaction columns having sufficiently large volume of liquid, tests have shown that the difficulties are not dependent only upon this factor. According to this invention, however, the difficulties are eliminated in a simple way, and I accomplish this by providing an arrangement in which the heat supply from the heat source to the boiler along a longitudinal extent of the lower part of the flue tube is essentially less than the heat supply from the heat source to the liquid circulating pump along such longitudinal extent.

The invention will be hereinafter more fully described with reference to the embodiment diagrammatically shown in the accompanying drawing, and in this connection also further characteristic features of the invention will be set forth.

In the single figure, part of an absorption refrigerating apparatus of the inert gas type which is of immediate interest in connection with the invention is diagrammatically shown. It will be assumed that the apparatus operates with hydrogen gas as inert gas, water as absorbent and ammonia as refrigerant.

In the drawing reference character 10 denotes a pipe serving as a flue tube in the lower mouth of which a heat source, such as a gas burner 6, for example, is provided. Wound concentrically about the flue tube is a liquid heat exchanger 11 which is in the form of a coil having a constant pitch. On one side the internal pipe 12 of the liquid heat exchanger communicates via a conduit 13 with the absorber vessel of the apparatus denoted by 14, such vessel containing absorption solution rich in refrigerant. In a well known manner, inert gas rich in refrigerant vapor enters the absorber through a conduit 8, and inert gas weak in refrigerant passes from the absorber through a conduit 9.

At its upper end the pipe 12 opens into a conduit 15 which is vertically disposed and closed at the bottom. The conduit 15 is heat-conductively connected, as by welding, with the flue tube 10 along a common generatrix. In a direction upwards the conduit 15 serves as a vapour conduit leading to the condenser, not shown. The conduit 15 forms the boiler proper of the apparatus in which the main part of the refrigerant vapours are expelled. The rich solution flows from the absorber vessel 14 through the heat exchanger 11 into the conduit 15 in which it is brought to the boiling point, and with decreasing refrigerant concentration flows downwardly toward the bottom of the boiler. The lower end of the liquid circulating pump 19 is connected to the bottom part of the boiler, while the upper end thereof is connected to a stand-pipe 17, which is substantially vertically arranged and at its upper end communicates with the vapour conduit 16. The lower end of the stand-pipe 17 opens into the external pipe of liquid heat exchanger 11, through which the solution pumped into the pipe 17 flows into a conduit 18, which opens into the air-cooled absorber 7 of the apparatus, such absorber being suitably shaped in the form of a pipe coil. The pump comprises the pipe 19 which is welded to the flue 10 from one point 20 up to another point 21 along a common generatrix. The distance between the points 20 and 21 must attain a minimum of 50 mm., and should preferably exceed 70 mm.

It has been already mentioned that the expulsion of refrigerant principally takes place in the boiler proper 15. Therefore, the solution at the lower part of the boiler 15 is relatively poor in refrigerant, whereby the pump 19 operates at a higher temperature corresponding to the lower concentration of refrigerant. Though in certain cases, when the expulsion of refrigerant is not intensified, the pump conduit 19 in a well known manner may be formed as a coil wound round the lowest part of the flue tube 10 and includes a riser possibly thermally spaced from the flue, it is in general of greatest importance that the pump should be constructed in a manner like that shown in the drawing. By extending the heat-conductive connection between the flue 10 and the pump conduit 19 in a vertical direction, at least in the case of large size apparatus, up to a point located level with or higher than the liquid level in the vessel 14, satisfactory pumping conditions are essentially increased, especially when starting. As already mentioned, the elevation of the reaction column is also very important.

The solution raised by the pump 19, the refrigerant concentration of which is decreased by refrigerant expulsion in the pump, is conducted into the stand-pipe 17, where, if desired, a further expulsion of refrigerant may be effected. In such case the stand-pipe is heat-conductively connected with the flue 10. In most cases, however, expulsion of vapours in the stand-pipe 17 is not necessary and may be disadvantageous, as the refrigerant vapours so expelled will contain great quantities of vapours of the absorbent. On the other hand, in most cases it is advantageous to utilize the heat contents of the flue gases passing through the upper parts of the flue by providing such a heat-conductive connection between the stand-pipe and the heating flue 10 that the poor solution passes downwardly through the stand-pipe at a constant or somewhat increased temperature. In this manner the heat-contents of the flue gases are effectively utilized. In view of the low level of the boiler, difficulties may otherwise arise in the rational utilization of the heat-contents of the flue gases.

As appears from the drawing the direct heat-conductive connection between the pump pipe 19 and heating flue 10, which may consist of an integral welded seam or of welded points more or less marked, extends downwardly to the lower part of the flue 10 at which region the heat-source 6 is placed. Thus the welded seam is generally situated level with the hottest portion of the heat-source. In spite of this arrangement, the heat supply to the pump in many cases is not sufficient to insure satisfactory liquid circulation. In order to achieve an increased heat supply to the pump, the direct heat-conductive connection between the boiler pipe 15 and the lower part of the flue 10 is, according to the invention, interrupted or broken along a certain longitudinal distance of the flue. Such a break may be made in different ways, such as, for example, by providing slits in the lower part of the flue 10 at both sides of the contact-surface between the boiler and the flue. Generally, however, it is more advantageous to provide the arrangement as shown in the drawing. As illustrated, the boiler pipe 15 is bent outwardly from the lower part of the flue in such a way that an air gap 22 is formed between the flue and the boiler pipe. In most cases, however, it is possible to utilize a straight boiler pipe and to form the welded seam along the upper part of the pipe in such a way that the pipe will be spaced a few millimeters from the flue, whereby the upper portion of the space between these parts is filled with welding material, whereas the lower portion of the space remains free.

It has been found in apparatus of the kind under consideration the sensitivity of the heat distribution between the flue and the pump on one side and the boiler on the other is extraordinarily great. This apparently is due to the fact that the boiler absorbs important heat quantities from the lower and hottest part of the flue, such heat quantities being partially absorbed at the cost of the heat supply to the pump. Hence, the boiler pipe 15 will contain very poor solution, which is especially true about the bottom layer of the liquid body therein. It is from such lower end of the boiler pipe 15 that solution is delivered to the pump 19, and every change in the heat-conductive connection between the boiler pipe 15 and flue 10 along the lower part of the common generatrix will act in two ways in the same direction to influence the extent of vapour expulsion in the pump 19, and such vapour expulsion as a matter of fact will be less as the refrigerant concentration of the solution fed to the pump becomes reduced.

The invention is not to be limited to the embodiment shown but may be varied in several ways within the scope of the basic inventive idea. This is applicable particularly to the manner of forming the heat-conductive connection between the flue on one side and the pump and the boiler on the other, as well as to the heat transfer resistance from the heat-source to the pump and the boiler, respectively.

I claim:

1. In an absorption type refrigerating system, a circuit for absorption liquid including an absorber and a plurality of vertically extending pipes, at least a first pipe forming a boiler for holding a body of absorption liquid, a second pipe being connected in said circuit to receive entirely by gravity flow from said absorber absorption liquid having a concentration of refrigerant less than that of liquid flowing from the outlet of the absorber, said second pipe forming a heat operated vapor lift having a vapor forming part, a vertically extending heating member in thermal contact with said boiler and said second lift pipe and forming therewith a vapor expulsion unit, said vapor expulsion unit being so constructed and arranged that the thermal contact of each of said pipes with said heating member is such that heat is effectively supplied from the latter to the wall portion of the vapor forming part of said second pipe and heat is ineffectively supplied from the heating member to the wall portion of said first pipe or boiler which extends upwardly from the bottom thereof and is contacted by liquid in the extreme lower part thereof.

2. In an absorption type refrigerating system, a circuit for absorption liquid including an absorber and a plurality of vertically extending pipes, at least a first pipe forming a boiler, a second pipe being connected in said circuit to receive entirely by gravity flow from said absorber absorption liquid having a concentration of refrigerant less than that of liquid flowing from the outlet of the absorber, said second pipe forming a heat operated vapor lift having a vapor forming part, a vertically extending heating member at the lower end of which is adapted to be positioned a heat source, said heating member being in thermal contact with said boiler and said second lift pipe and forming therewith a vapor expulsion unit, and said vapor expulsion unit being so constructed and arranged that the vapor forming part of said second lift pipe is in thermal contact with a region of said member which is nearer to the lower end thereof than the region of the thermal contact of said boiler with said member.

3. In an absorption type refrigerating system, a circuit for absorption liquid including an absorber and a plurality of vertically extending pipes, at least a first pipe forming a boiler, a second pipe being connected in said circuit to receive absorption liquid having a concentration of refrigerant less than that of liquid flowing from the outlet of the absorber, said second pipe forming a heat operated vapor lift having a vapor forming part, and a vertically extending heating member in heat transfer relation with said boiler and said second lift pipe and forming therewith a vapor expulsion unit, said vapor expulsion unit being so constructed and arranged that an air gap is provided between the lower part of said boiler and a region of said heating member in heat transfer relation with the vapor forming part of said second lift pipe.

4. In an absorption type refrigerating system, a circuit for absorption liquid including an absorber and a plurality of vertically extending pipes, at least a first pipe forming a boiler, a second pipe being connected in said circuit to receive absorption liquid having a concentration of refrigerant less than that of liquid flowing from the outlet of the absorber, said second pipe forming a heat operated vapor lift having a vapor forming part, one of said vertically extending pipes being connected in said circuit to cause vapor formed in said second lift pipe to raise liquid by vapor lift action under a reaction head formed by a liquid column contained therein freely communicating with the liquid outlet of the absorber through an unbroken liquid body, and a vertically extending heating member in heat transfer relation with said boiler and said second lift pipe and forming therewith a vapor expulsion unit, said vapor expulsion unit being so constructed and arranged that an air gap is provided between the lower part of said boiler and a region of said heating member in thermal contact with the vapor forming part of said second lift pipe.

5. An absorption refrigerating apparatus of the inert gas type including a refrigerant vapor supply line, an absorber, a liquid heat exchanger, a vapor expulsion unit comprising a vertically extending heating tube and a plurality of vertically extending pipes, a connection including said heat exchanger so interconnecting the outlet of the absorber and a first pipe that the latter contains a liquid column freely communicating with the absorber through an unbroken body of liquid, another connection including said heat exchanger so interconnecting the liquid inlet of the absorber and a second pipe that the latter contains a liquid column freely communicating with the absorber, at least one of said pipes serving as a boiler for holding a body of absorption liquid which is thermally connected to said heating tube, both of said pipes communicating with said vapor supply line, and a third pipe whose maximum diameter throughout its length is smaller than that of said heating tube, said third pipe having its lower end connected to said first pipe and its upper end connected to said second pipe and having a vapor forming part thermally connected to said heating tube for raising liquid by vapor lift action, the thermal connection of said boiler pipe and said third pipe to said heating tube being effected along vertical zones at the periphery of the latter on spaced apart vertical lines at different exterior surface portions of said heating tube, and said vapor expulsion unit being so constructed and arranged that a region of said heating tube thermally connected to the vapor forming part of said third lift pipe supplies heat at a faster rate to the latter than to extreme bottom liquid containing portion of said boiler.

6. An absorption refrigeration system having a circuit for absorption liquid including an absorber and a generator comprising a plurality of pipes, two of said pipes being joined to a third pipe in thermal contact therewith on lines substantially parallel to the longitudinal axis of said third pipe which serves as a heating flue, and said two pipes forming, respectively, a vapor lift to raise liquid in said circuit and a boiler allowing free relative movement of vapor and liquid therein, said vapor lift pipe throughout its length having a maximum diameter less than that of said flue pipe and thermally contacting said flue pipe at a level below the thermal contact between the lowest liquid containing portion of said boiler pipe and the flue pipe and being connected in said circuit to receive absorption liquid having a concentration of refrigerant which is weaker than that of enriched liquid flowing from the outlet of the absorber.

WILHELM GEORG KÖGEL.

REFERENCES CITED

The following references are of record in the file of this patent:

UNITED STATES PATENTS

| Number | Name | Date |
|---|---|---|
| 1,802,537 | Roos | Apr. 28, 1931 |
| 2,354,982 | Bikkers | Aug. 1, 1944 |
| 2,363,771 | Bergholm | Nov. 28, 1944 |

FOREIGN PATENTS

| Number | Country | Date |
|---|---|---|
| 558,338 | Great Britain | Dec. 31, 1943 |